United States Patent [19]

Polaert et al.

[11] Patent Number: 4,800,436
[45] Date of Patent: Jan. 24, 1989

[54] TELEVISION SYSTEM WITH IMPROVED TEMPORAL RESOLUTION ON DISPLAY OF A TELEVISION SIGNAL

[75] Inventors: Rémy Polaert, Villecresnes; Bruno Schorter, Morsang S/Orge, both of France

[73] Assignee: U.S. Philips Corp., New York, N.Y.

[21] Appl. No.: 20,923

[22] Filed: Mar. 2, 1987

[30] Foreign Application Priority Data

Mar. 4, 1986 [FR] France .................... 86 02993

[51] Int. Cl.⁴ ............................................ H04N 5/74
[52] U.S. Cl. .................................................... 358/232
[58] Field of Search ............... 358/236, 241, 231, 232, 358/61

[56] References Cited

U.S. PATENT DOCUMENTS

| | | | |
|---|---|---|---|
| 3,520,589 | 7/1970 | Angel | 358/232 |
| 3,637,931 | 1/1972 | Donjon | 358/232 |
| 3,723,651 | 3/1973 | Gorog | 358/236 |
| 4,611,235 | 9/1986 | Trias | 358/236 |

FOREIGN PATENT DOCUMENTS

1473212 3/1967 France .
1479264 5/1967 France .

Primary Examiner—Tommy P. Chin
Attorney, Agent, or Firm—Gregory P. Gadson

[57] ABSTRACT

A optical relay which includes a target plate which is made of an electrically insulating material and allows light to pass in a manner depending on the electric field parallel to the direction of propagation of this light, wherein a first side of this target plate is scanned by an electron beam produced by an electron gun, an anode in the form of a grid, a thin plate which is optically transparent and electrically conducting, an amplifier applying the video information of the video signal to the relay. The optical relay includes means by circuit elements which it is is capable of writing and erasing the target plate in the charge accumulation mode cooperating with a precursor eraser acting on a limited number q of scanning lines positioned beyond the line n to which the write operation relates. In order to transmit the picture in accordance with a television standard, a de-interlacing arrangement is used.

6 Claims, 4 Drawing Sheets

TELEVISION SYSTEM WITH IMPROVED TEMPORAL RESOLUTION ON DISPLAY OF A TELEVISION SIGNAL

BACKGROUND OF THE INVENTION

The invention relates to an optical relay comprising a target plate which is made of an electrically insulating material and allows light to pass in a manner depending on the electric field parallel to the direction of propagation of this light, means for having a first side of the target plate scanned by an electron beam produced by an electron gun, an anode in the form of a grid suitable for receiving the secondary electron caused by this beam, an optically transparent and electrically conducting plate provided against the second side of the target, an amplifier applying to the relay the video information component of the video signal formed by a sequence of scanned lines, the target plate being made of a material which becomes ferro-electric below a certain temperature, the Curie temperature, in the region of which the optical relay operates to supplying a final picture.

An optical relay of this type, for projection television, is disclosed in the French Patent FR No. 1,473,212 and FR No. 1,479,284 because the introduction of such U.S. Patent to the specification raises the issue of new matter. For a better understanding of the invention the operating principle of such an optical relay will now be given first. More detailed information can be obtained from the cited patent.

The scope of the invention relates to the conversion of a time-variable electric signal, which represents visible information, into a visible picture. This is one of the functions performed by a television receiver.

In the picture display tube of such a receiver, the electron beam usually performs the three basic functions of such a conversion:

f1 it supplies the energy to be converted into light: the light output power of the tube is therefore always lower than the power transferred by the beam;

f2 it effects the spatial scan of the picture surface;

f3 it supplies the video information.

Because of, inter alia, the functions f2 and f3, the power of the beam, and hence the picture brightness, cannot be increased to the extent required for projection onto, for example, a large screen.

It has therefore been proposed to separate function f1 performed, for example, by an arc lamp, from the functions f2 and f3 performed by what is commonly referred to as an "optical relay". Such a relay uses a crystal producing an electro-optical effect commonly referred to as the "Pockel's effect". A crystal consisting of double acid potassium phosphate $KH_2PO_4$, termed KDP hereinafter, is suitable for this purpose.

This effect can partly and briefly be described as follows: when the crystal, which is an electrical insulator, is exposed to an electric field parallel to its crystal axis c (the three crystal axes a, b and c are mutually orthogonal, the axis c being in this case the optic axis), the index n of this crystal, for light rays propagating in the direction c and linearly polarized in the plane ab, depends on the direction of said polarization. More specifically, if X and Y designate the bisectors of the axes a and b, and if the parameters of the crystal with respect to these different directions are designated by the levels used for said directions, it can be said that the diagram of the refractive indices in the ab plane forms an ellipse having axes X and Y, instead of forming a circle and that the difference between said indices $n_x - n_y$ is proportional to the electric field applied. It follows therefrom that, if the incident light rays are polarised in parallel with the axes a, for example, the intensity I of the light passing through an output polarizer is $I = I_o \sin^2 kV$ if the direction of polarization of this polariser is in parallel with the axis b, and $I = I_o \cos^2 kV$ if this direction is in parallel with the axis a, $I_o$ being equal to the intensity of the incident light if no parasitic absorption occurs, V being the electric potential difference between the two planes of the crystal and k being a coefficient depending on the crystallized material used.

In order to obtain a projected picture by means of a lamp via this device, it is sufficient, as stated above, to produce an electric field in parallel with the axis c and to cause the value of this field to correspond, in any point of the target plate, to the brightness of this field in the corresponding point of the picture to be obtained. To that end, an electron beam originating from an electron gun, which passes through conventional deflection members, scans the target plate, thus performing function f2. The function f3, that is to say in this case the control of the electric field is also performed by the beam in the following manner.

When the electrons of the beam strike the target surface, they cause, if their energy is contained within suitable limits, to the extent to which the anode potential is adequately high, the emission of secondary electrons in a quantity higher than that of the incident electrons. This results in an increase of the electric potential in the point of incidence so that the potential difference between the anode and that point decreases. When the electrons of the beam reach this point in a sufficient quantity, this potential difference becomes negative and reaches such a value (for example $-3$ V) that each incident electron only causes the emission of one sole secondary electron. The potential in this point is thus fixed at a value limited with respect to the potential of the anode. For that purpose it is sufficient, taking account of the scanning rate, that the intensity of the beam is of an adequate value. Since the anode potential is constant, each passage of the electron beam fixes, as described in the foregoing, the potential in any point A of the surface reached at a value $V_o$, independent of this point and the instant of passage. But the corresponding electric charge appearing at that point depends on the potential of the control electrode in close vicinity thereof, at the other side of the target plate.

When the potential of this electrode at the instant of passage is denoted VA, this charge is proportional to $V_o - VA$, VA representing the value of the video information signal at the instant of its passage.

The target plate whose double refraction depends on the electric field, is formed by a KDP monocrystal of which approximately 95% of the hydrogen is in the form of heavy hydrogen (deuterium).

The Pockels effect is proportional, for a given crystal thickness, to the charges appearing on the sides of the crystal and consequently for a given control voltage to the dielectric constant of the crystal. For that reason a target plate is used which is made of a crystal which becomes ferro-electric below a certain temperature, the Curie temperature, and it is advantageous to operate near this temperature, as the dielectric constant then reaches very high values and the optical relay can operate with control voltages which are easy to employ (the Pockels effect being proportional to the product $\epsilon V$).

The most frequently used crystals exhibiting this phenomenon are acid salts, more specifically those of the KDP type in the class of quadratic crystals, and have an optic axis which is parallel to the crystal axis c. Its Curie temperature is in the region of $-53°$ C. Above the Curie temperature the DKDP is a quadratic crystal of the symmetry class 42 m and has a para-electric behavior. Below the Curie temperature the DKDP becomes orthorhombic, symmetry class mm$^2$, and it shows a ferro-electric behavior: locally there is spontaneous polarization and ferro-electric domains appear.

At ambient temperatures, the crystal is anisotropic but near the Curie point the anisotropy becomes extremely important. The change of state is accompanied by sudden variations of the physical properties depending on the crystal axis:

piezo-electric coefficients
electro-optical coefficients
dielectric constants $\epsilon_x$ and $\epsilon_z$ Thus, the dielectric constant $\epsilon_z$ changes from a value of approximately 60 at ambient temperature to a value of 30,000 at the Curie temperature.

It is a known fact, from the electric point of view, that the apparent thickness e of the crystal made of DKDP is $$e = E.(\epsilon_x/\epsilon'_z)0,5.$$

The target plate is thinner according as the ratio $\epsilon_x/\epsilon'_z$ is smaller, wherein $\epsilon'_z$ is the value of $\epsilon_z$, when the crystal is blocked mechanically. Actually in an optical relay the monocrystalline plate made of DKDP having a thickness E of approximately 250 microns, is cemented firmly on a rigid support: a 5 mm thick fluorine plate.

The target plate of the optical relay is then usually cooled to $-51°$ C., that is to say to a temperature slightly higher than the Curie point. In these conditions $\epsilon_x/\epsilon'_z$ is equal to 1/9 and the apparent thickness of the crystal is approximately 80 microns, which gives the optical relay an appropriate picture resolution. Below the Curie point this ratio $\epsilon_x/\epsilon'_z$ is still smaller, which highly improves the picture resolution.

Such an optical relay is used in the "potential stabilizing" mode for reproducing pictures, especially television pictures, as it simultaneously effects writing and erasing of the picture. The electron beam acts in the manner of a floating short circuit for adjusting at any moment the potential in each point of the target plate surface to the value corresponding to the local brightness of the element of the picture to be projected. This is done spontaneously, either by depositing electrons, or by withdrawing electrons by secondary emission until the potential of the target plate in the point under consideration stabilizes at the value imposed by the video signals.

In this mode the beam current is constant and the video signal modulates the voltage between the target and the anode in the form of a grid.

To improve the resolution, the aberrations are reduced to the best possible extent by modifying the diaphragms and the focussing coil, and by introducing bipolar and quadrupolar correction coils. It is alternatively possible to reduce the beam current required for writing, by increasing the thickness of the target.

But it is not possible to reduce the grid-to-target distance, which is of the order of 20 $\mu$m, to increase the resolution, in view of technological factors. In addition, this spatial resolution can only be increased to the detriment of the transparency of the grid, which causes a very important delay (0.3 to 0.5 seconds) which is visible when a white area is written in, for example, negative video.

In the potential stabilising mode, there is therefore a systematic link between the resolution and the delay and an improvement in one of these factors is effected to the detriment of the other.

In addition, the potential stabilising operating mode gives rise to faults which are very disadvantageous. More specifically the readability of the reproduced characters, be they black on a white background or the other way around, deteriorates. Similarly, when the reproduced character is, for example, a white rectangle, the contour deteriorates and fraying at the four corners of the rectangle occurs.

SUMMARY OF THE INVENTION

The invention has for its object to obviate these disadvantageous effects by increasing the resolution limit and suppressing the above delay and fraying phenomena.

To that end the invention defined in the opening paragraph, is characterized in that the relay comprises means through which the target plate can be written and erased in the charge accumulation mode, comprising the video amplifier applying the video modulation to the wehnelt electrode in the write mode, polarizing generators for the grid-shaped-anode and the transparent thin plate and an electron beam deflection device, said means cooperating with precursor erasing means acting on a limited number q of scanning lines positioned beyond the line n on which the writing operation is effected.

The invention is also characterized in that the precursor erasing means comprise a line counter which determines the $(n+p)^{th}$ scanning line, this counter energizing the beam deflection device acting on the electron beam to ensure that on the target plate it erases q lines substantially centred around the $(n+p)^{th}$ line, without affecting line n, where p is higher than q/2.

The invention is also characterized in that the beam deflection device controls the beam deflection in such a manner that the beam describes on the target plate a rectangular figure formed by a trace path during which writing of the line n is effected, the electron gun producing a focussed beam with a write current, and a retrace path during which the erase is effected, the electron gun producing a wide beam having an erase current exceeding the write current so that at least the total number of charges deposited during the writing procedure is withdrawn during the erase procedure.

In the "charge accumulation" write mode the target plate is negatively polarized, for example at $-250$ V with respect to the grid, and the intensity of the electron beam is modulated for depositing, by secondary emission, a greater or less quantity of positive charges on the target plate as a function of the video signal, the modulation being effected by the wehnelt electrode.

In contrast with a phosphor screen which extinguishes in a few milliseconds, the target plate made of DKDP is a perfect isolator and its persistence is almost infinite. It is necessary to erase the target plate to allow a new picture to be written, and for that purpose it is necessary to polarise the target plat at 0 Volt and to deposit a number of charges at least higher than the number of charges used during writing. Let $I_i$ and $T_i$ be the beam current and the period of time used for writing a white area on a given surface. This results in $(\delta-1)I_iT_i$ charges to be deposited, $\delta$ being the secondary emission coefficient. For erasing, a time $T_e$ is required and a beam current $I_e$ such as $I_eT_e \geq (\delta-1)I_iT_i$.

If, for example, one opts for erasing during the line retrace, it is necessary to have a large current. For the standard 625 lines, assuming the secondary emission coefficient to be $\delta=3$, the erase current $I_e$ must be 8.5 times higher than the write current $I_i$.

Write mode

Let $I_i$ be the current of the incident beam. Writing the target plate is effected by an electron current I which leave the target plate by secondary emission: $I=I_i(\delta-1)$. To display a white level corresponding to $V_o$ (quarter-wave voltage), the necessary incident bean current $I_i$ has then the relation:

$$I_i = \frac{CV_o}{b(\delta-1)T_i\tau} \quad (1)$$

where:
C=the capacitance of the crystal made of DKDP
$V_o$=the quarter-wave voltage for the white level=150 V
b=the blanking factor (blanking designates the suppression of the video signal and the erase signal during the line and field scan retrace)
$\delta$=secondary emission coefficient of the target
$T_i$=picture period
$\tau$=the transparency of the grids $G_1$ and $G_2$.
The capacity of the thin plate is:
$C=\epsilon_0.\epsilon'_z S/L$ (S=the surface of the target and L=the thickness of the target.
The above expression can be written:

$$I_i = \frac{\epsilon_o \epsilon'_z SV_o}{Lb(\delta-1)T_i\tau} \quad (2)$$

Ignoring the grid-target capacitance relative to the capacitance of the crystal it is possible to write: $\delta_o = \epsilon_o\epsilon'_zV_o/L$, $\delta_o$ being the charge density for the quarter-wave phase shift across a plate made of DKDP and having a thickness L (that is to say a half-wave shift when the thin plate is used for the trace and retrace paths).

By way of example, with the following intrinsic parameters:
L=240 μm
$V_o$=150 volts
$\epsilon'_z$=600
$\epsilon_o$=1/36π10$^9$
one has: $o_o$=3,3.10$^{-3}$ C.m$^{-2}$ or:

$$I_i = \frac{o_o S}{b(\delta-1)T_i\tau} \quad (3)$$

In the case of the following functional parameters, given by way of example:

| A target plate of 28 × 38 mm | $S = 1,063 \cdot 10^{-3}$ m$^2$ |
|---|---|
| target thickness | L = 240 μm |
| picture period | $T_i = 40 \cdot 10^{-3}$ s |
| blanking factor | b = 0,81 |
| secondary emission | $\delta = 3$ |
| grid transparency | $\tau = 0,92$ | a beam current $I_i$=59 μA is obtained for writing a picture at a maximum white level corresponding to 150 Volts on a 240 μm thick target plate.

In accordance with the relation 2, it is highly recommendable, to reduce the current, to use a thin target plate covered by a final layer having a strong secondary emission. The current reduction reduces the phase charge effects and improves the resolution.

Erase mode

The erase current is actually the beam current itself; there is always secondary emission but the secondary electrons all fall back on the target plate around an impact point in a wide beam, consequently:

$$I_e = \frac{CV_o}{T_e\tau} \quad (22)$$

wherein $T_e$=picture erase period.

Assuming erasure to be effected during each line retrace $T_e$=n $T_r$:

$$I_e = CV_o/nT_r\tau \quad (22')$$

(n=the number of scanning lines per picture, $T_r$=the period of the line retrace), this erase period $T_e$ is not more than equal to the blanking period, that is to say $$T_e \leq (1-b) T_i \quad (23)$$

In this case $$I_e \geq \frac{CV_o}{(1-b)T_i\tau} \quad (24)$$

that is to say $$I_e \geq I_i(\delta-1)\frac{b}{(1-b)} \quad (25)$$

where $\delta=3$ and b=0,81, $I_e/I_i \geq 8,5$.

In the example chosen, using a 240 μm thick target plate, it is obtained that $I_e$=500 μA.

The disproportion between the current necessary for erasing and writing can be significantly reduced by modifying the blanking factor b. Actually, if an electronic line-de-interlacing circuit is used, for example of the type described hereinafter, it is possible to modify the signal rate with the object of reducing the write period and to prolong it beyond the erase period.

The following Tables list the duration, the write and erase current as well as the passband of the video signal for different blanking factors b for the 625 and 1023-line TV standard.

TABLE I

| | standard 625 lines, 50 Hz | | | |
|---|---|---|---|---|
| b: blanking factor | 0,81 | 0,65 | 0,50 | 0,33 |
| Scanning period (μs) | | | | |
| trace | 52 | 42 | 32 | 21,3 |
| retrace | 12 | 22 | 32 | 42,7 |
| (total = 64) | | | | |
| Current (μA): | | | | |
| writing | 59 | 73 | 96 | 145 |
| erasing | 500 | 271 | 192 | 145 |
| Video passband (MHz) | 10 | 12,4 | 16,3 | 24,4 |

TABLE I-continued

| standard 625 lines, 50 Hz | | | | |
|---|---|---|---|---|
| b: blanking factor | 0,81 | 0,65 | 0,50 | 0,33 |
| for 1043 elements per TV line | | | | |

TABLE II

| Standard 1023 lines, 60 Hz | | | | |
|---|---|---|---|---|
| b: blanking factor | 0,785 | 0,65 | 0,50 | 0,33 |
| Scanning period (µs) | | | | |
| trace | 25,6 | 21,2 | 16,3 | 10,8 |
| retrace | 7 | 11,4 | 16,3 | 21,8 |
| (total = 32,6 | | | | |
| Current (µA): | | | | |
| writing | 73 | 88 | 115 | 174 |
| erasing | 534 | 327 | 230 | 174 |
| Video passband (MHz) for 1043 elements per TV line | 20,3 | 24,5 | 31,9 | 48,3 |

In charge accumulation the delay is zero. Actually, before each writing operation, the preceding picture is completely erased and, consequently, no residues of the previous pictures can accumulate.

The charge accumulation mode has several advantages: the grid-target plate distance has no effect on the picture resolution, therefore the grid can be mounted at 0.5 mm, that is to say at several millimeters, from the target plate. The electrostatic force between the target and the grid is reduced by a factor of $10^2$ to $10^3$ and the grid shadow is significantly reduced.

Acting thus the following difficulties are eliminated:
difficulties in the manufacture and mechanical assembling of the grid,
keeping this grid under tension
difficulties in the resistance of the transparent conducting layer,
moiré between the spatial frequency of the test pattern and the spatial frequency of the grid wires.

There seems to be no relation any more between the resolution limit and the number of grid wires. Overmodulation of the contours and fraying are suppressed, which increases the readability of characters and makes the picture more pleasing to the eye.

In charge accumulation the video amplifier modulates the wehnelt (approximately 60 volts at 8 pF) instead of the target plate (150 V at 400 pF) in the potential stabilizing mode.

To erase the target plate, a precursory erasure is used which is termed precursory because it precedes the writing operation and acts on a few lines situated beyond the line being written.

It is desirable for the erasure to be wider than the written area when it is assumed that the line just written is not effected, that is to say on the condition that the erasing operation is effected a few lines before the the line to be written.

Let n be the number of the line to be written. Preferably, erasing is done during each line retrace with a current I×10 which will extend across, for example, q=10 lines and concerns the lines of the order n+2 to n+12. The spot continuously describes 7-line high rectangles and scans the screen from top to bottom at the field scanning rate.

The brightness remains substantially unchanged as the black band preceding the writing operation occupies in this example a maximum height of 12 lines when the picture is very dark and a height of 2 lines when a very bright picture is concerned, anyway a loss in the luminous level is less than 12/625, i.e. approximately 2%. There is no visible flicker.

But to ensure that the even and odd lines are not erased simultaneously, which would produce a reduction in brightness relative to the potential stabilising mode, it is necessary to cancel the scanning line interlace. If a closed-loop television system is used, the pick-up camera must be specially modified to produce a non-interlaced video signal. This also holds for a picture generator producing computer images. Since the existing TV standards operate on the interlace principle, it is necessary to convert the standards and to ensure that all the lines, for example 625 lines, are contiguous and move during one single 40 ms field.

Consequently, this mode of operation using a precursory erase procedure requires an interlaced-standard-to-non-interlaced-standard converter.

So as to effect this standard conversion, a large-capacity picture memory is preferably used.

The de-interlacing circuit has for its object to rearrange each of the odd 312.5 lines (odd field) with the even 312.5 lines (even field) in such a way as to reshape a complete picture in which the 625 lines move regularly one after the other in one sole sequence of 40 ms. It is then necessary to store two fields in their totality in the memory before effecting the re-arrangement and if a sequential access memory is concerned, two blocks of the picture memory are required which are alternately in the load and the read state.

If, for example, one wants to store a picture of 1200 P/L×100 lines, digitized in 8 bits, this results in $9.6 \times 10^{+6}$ bits. To effect the de-interlace using a sequential access memory, a storage capacity of $1.92 \times 10^{+7}$ bits is required. Integrated-circuit memories comprising charge transfer devices having a capacity of 300 kbits per box, render it possible to realize this operation.

BRIEF DESCRIPTION OF THE DRAWINGS

The invention and how it can be put into effect will be better understood from the following description, given by way of non-limitative example with reference to the accompanying Figures. Herein.

DETAILED DESCRIPTION OF THE INVENTION

Figure 1:
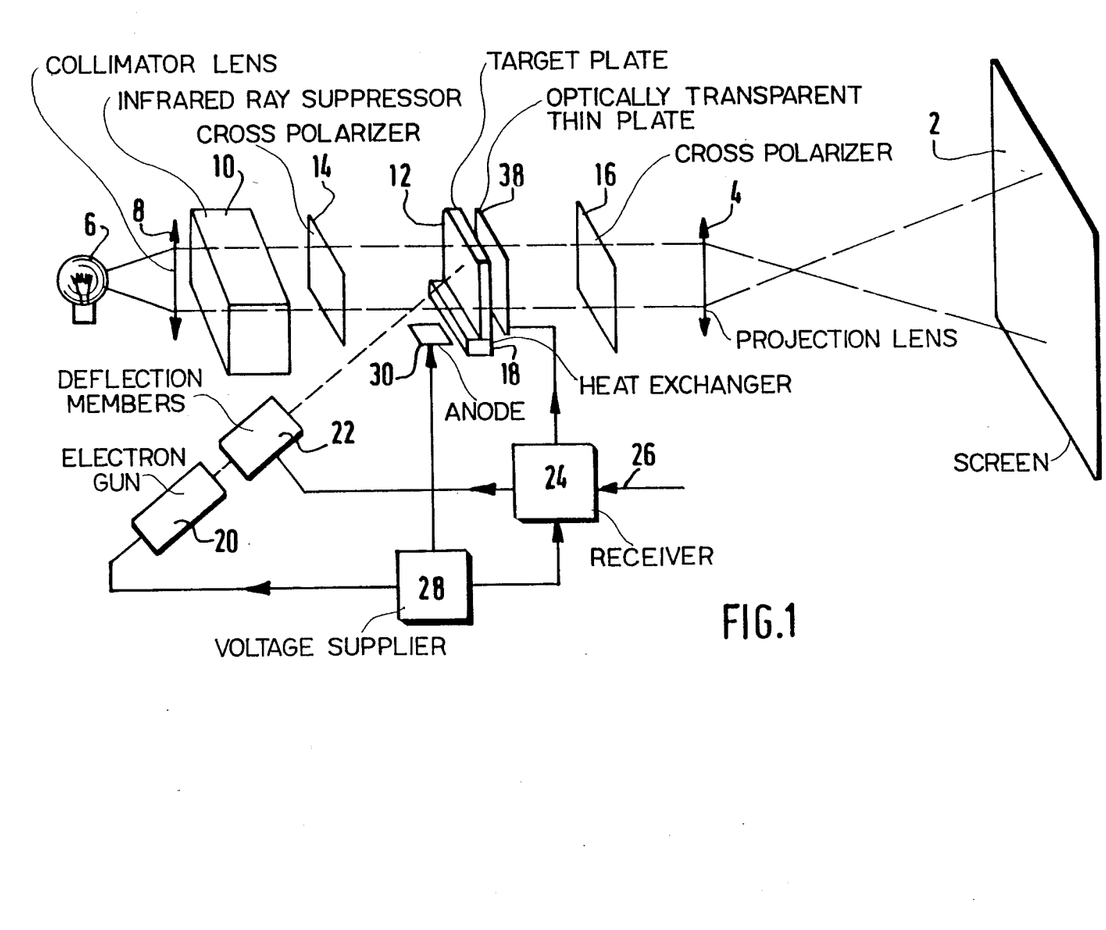
FIG. 1 is a sectional view of the basic portion of the optical relay in accordance with the prior art.

FIG. 1 shows diagrammatically the essential elements of an optical relay according to the invention, and the elements cooperating with this relay for producing a visible picture on a screen 2 through a projection lens 4. The light is produced by a lamp 6, shown as an incandescent lamp, although other types of lamps may be employed. This light passes through a collimator lens 8, then through means 10 or infrared ray suppressor serving to suppress infrared calorific radiation. The optical relay is basically constituted by a target plate 12 consisting of a parallelopiped-shaped single crystal of KDP whose optic axis (c) is at right angles of the major sides, and is arranged between two cross-polarizers 14 and 16 whose polarization planes are parallel to two further crystal axes a and b of the single crystal. A heat exchanger 18 contacts the target plate 12 and keeps it at approximately its Curie temperature. An electron beam is incident on the left-hand side of the target plate 12, which beam is indicated by a broken line and is produced by an electron gun 20. This beam periodically scans the whole useful surface of the plate 12 by means of a beam deflection device 22, which is controlled by scanning signals from a receiver 24 which processes these signals on the basis of synchronizing signals applied to its input 26 together with the actual video information. A unit 28 or voltage supplier applies the required direct voltages to some of the members mentioned in the foregoing, and also to an anode 30. For the sake of clarity, this anode is shown in the form of a plate arranged in parallel with the light beam, as it will be obvious that this arrangement, which is very advantageously for letting through the light, hardly effective for collecting secondary electrons emanating from all the points of the surface of the plate 12 in which the electron beam is incident. For that reason, in actual practice, the anode 30 is therefore arranged parallel to the surface of the target plate 12 in close vicinity thereof. Since the incident electron beam and the light beam have to pass the anode, the anode is, for example, in the form of a grid. A thin plate 38 which is electrically conductive and optically transparent and is formed by, for example, a thin gold layer, is provided behind the target plate 12. The video information is applied to this thin plate by the receiver 24.

Figure 2:
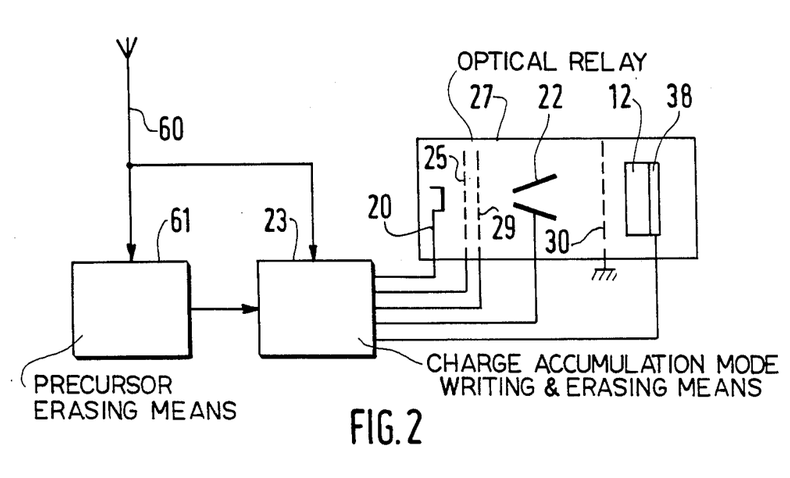
FIG. 2 is a block circuit diagram representing the means for having the optical relay operate in the charge accumulation mode and a counter for effecting the precursory erase.

FIG. 2 shows basic elements 27 of the optical relay shown in FIG. 1. The electron gun 20 is here symbolised by a cathode. Means 23 make it possible for the optical relay to operate in the charge accumulation mode. To that end, in the write mode, the means 23 for the charge accumulation mode apply the modulation signal of negative polarity, received from a video generator symbolized here by an aerial 60, to a wehnelt 25. The direct polarizing voltage of the wehnelt electrode has, for example, a value of $-600$ Volts and the superposed modulation has a peak value of, for example, $-100$ Volts. The beam deflection device 22 operates such that the electron gun 20 writes on the $n^{th}$ line of the field. The means 23 simultaneously apply a direct polarizing voltage of $-250$ Volts to the thin plate 38 positioned behind the target plate 12. In the erase mode the electron beam is deflected by the device 22 to reach the $(n+p)^{th}$ line, for example $n+7$. At the same time the current produced by the gun 20 is increased by the means 23, by suppressing the wehnelt modulation.

In these two cases the anode 30 has ground potential. A ground terminal is also present in the means 23. Generally described, the anode 30 and the plate 38 are connected to polarizing generators which are comprised in the means 23. Finding the $(n+p)^{th}$ line is effected by a line counter 61 present in precursor erasing means which consequently controls the means 23. In the erase mode the thin plate 38 is adjusted to ground potential. When the information components to be shown on the screen require a grey scale or a half-tone scale, for example when they are not constituted by alphanumerical characters but by images representing persons, it is then recommendable to use an auxiliary focussing grid 29, which receives a portion of the video signal applied to the wehnelt 25.

The circuit diagram of FIG. 2 holds for the case in which the video signal arriving from the video generator does not correspond to an interlaced signal as may be the case for adapted cameras or internal broadcasting circuits.

Figure 3:
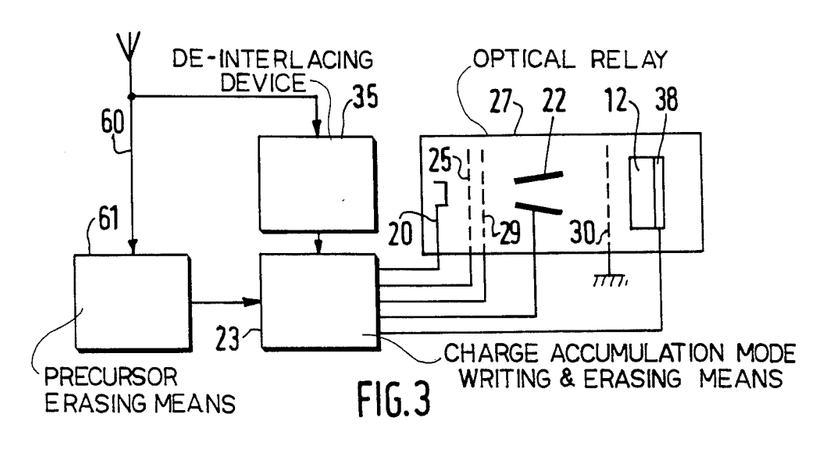
FIG. 3 is a block circuit diagram similar to the diagram of FIG. 2 having an additional picture memory for effecting de-interlacing of a television standard.

FIG. 3 relates to the general case of interlaced television standards. To provide the precursory erase it is recommendable, so as not to loose picture brightness, to effect a preliminary de-interlace. This is done in the de-interlacing device 35 which receives the video signal from the aerial 60. This de-interlacing device produces a de-interlace video signal which is applied to the wehnelt 25 via the means 23. Further elements are shown with the same reference numerals as in FIG. 2.

Figure 4:
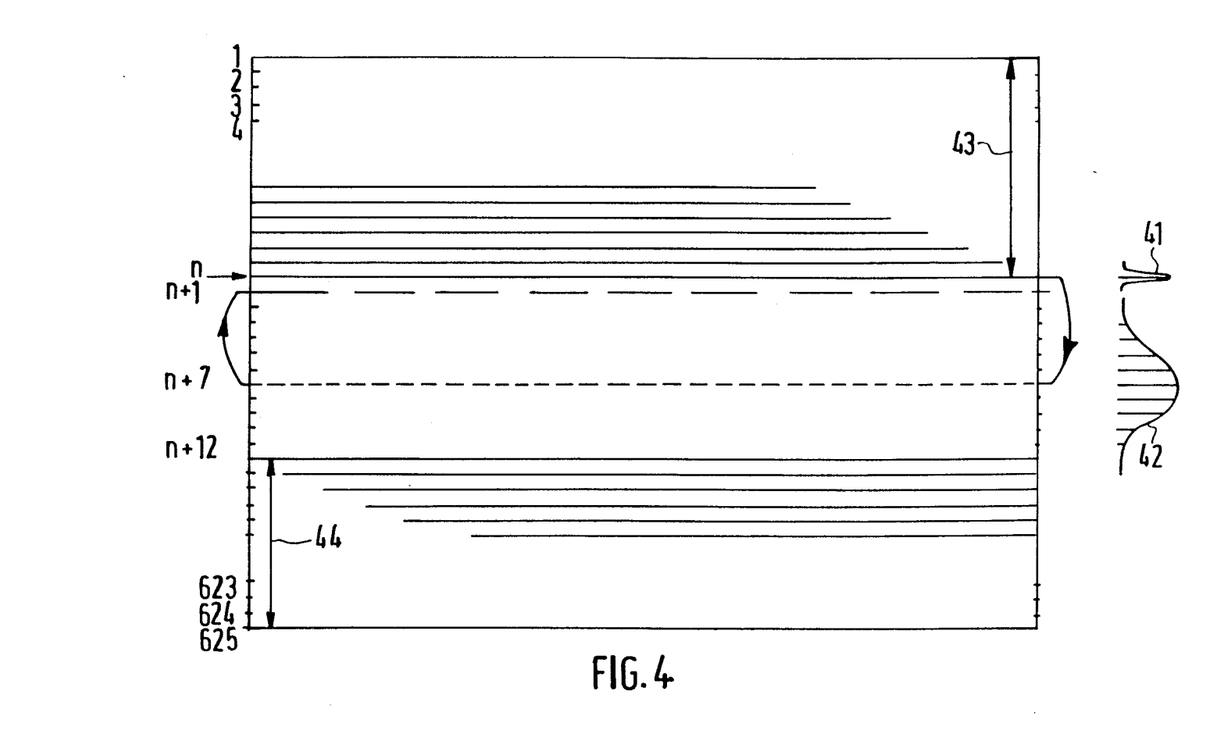
FIG. 4 shows a representation of the write mode and the precursory erase mode of a field according to the invention.

FIG. 4 shows the write mode and the precursory erase mode of a field according to the invention. This is shown for an example of a field having 625 lines. When the electron beam has finished writing the $n^{th}$ line, the deflection means cause the beam to pass to the $(n+p)^{th}$ line, for example line $n+7$. It then describes the $(n+7)^{th}$ line during the line retrace. When this $(n+7)^{th}$ line has been scanned, it is deflected to the $(n+1)^{th}$ line and returns to the write mode. In accordance with this last-mentioned mode the shape of the beam current is shown with the reference numeral 41. This is a beam current which is highly focussed on the $n^{th}$ line, having a value of, for example, $I_e = 59$ micro-ampere. In the erase mode the beam is highly defocussed, so that it covers a large number of lines, but it never reaches the $n^{th}$ lines just written. The erasure is thus effected from approximately the $(n+2)^{th}$ line to, for example, the $(n+12)^{th}$ line. The shape of the beam current is shown with reference numeral 42. The value of this erase current is much higher, for example 500 micro-amperes.

Reference numeral 43 denotes the new picture lines just written and reference numeral 44 denotes the lines of the preceding picture which have not yet been erased.

Figure 5:
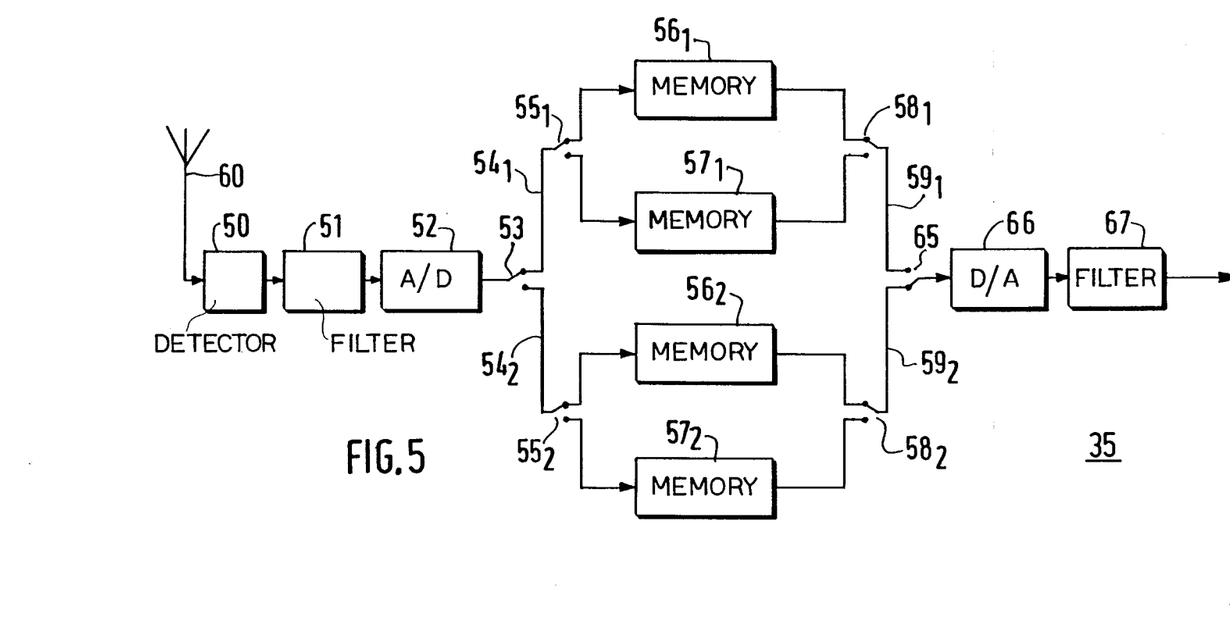
FIG. 5 is, by way of example, a block circuit diagram of a picture memory effecting the de-interlace.

FIG. 5 shows a de-interlacing device 35. When the signal is received by an aerial 60, it is detected by a detector 50 and thereafter filtered by a filter 51. This operation is not performed when the signal is produced in the form of a video signal supplied by a video generator. The video signal is digitized by means of an analog-to-digital converter 52.

The digital signal is switched by a change-over switch 53, alternately to two paths $54_1$ and $54_2$. This alternation occurs at the rate of a field period, for example 40 ms. The interlaced signal from the paths $54_1$ and $54_2$ is de-interlaced with the aid of respective change-over switches $55_1$ and $55_2$ which consecutively selects even and odd lines of each field. The selection is effected at the rate of every half field, that is to say every 20 ms in the above example.

Thus all the odd lines 1, 3, 5, ... are stored in the memories $56_1$ and $56_2$ for the respective paths $54_1$ and $54_2$ and all of the even lines 2, 4, 6, ... are stored in the memories $57_1$ and $57_2$ for the respective paths $54_1$ and $54_2$. To de-interlace each path, the change-over switches $58_1$ and $58_2$ will alternately select the even lines and the odd lines at the rate of a line period, for example 64 microseconds, to accomplish that on the output paths $59_1$ and $59_2$ the de-interlaced lines appear in the sequence 1, 2, 3, 4, 5, .... The memory blocks $56_1$ and $57_1$ on the one hand and the blocks $56_2$ and $57_2$ on the other hand operate alternately in such a manner that the first-mentioned blocks are loaded whilst the other blocks are read. This selection is done by means of a change-over switch 65. The digital signal is converted to the analog state with the aid of a digital-to-analog converter 66 and is thereafter filtered by a filter 67, whereafter it is suitable for use.

We claim:

1. An optical relay comprising an electrically insulating material target plate for passing light depending on the electric field parallel to the direction of propagation of this light, and said target plate becomes ferro-electric below the Curie temperature, in a region of which the optical relay operates for supplying a final picture, means for having a first side of the target plate scanned by an electron beam produced by an electron gun, an anode in the form of a grid, suitable for receiving the secondary electrons caused by this beam, an optically transparent and electrically conducting thin plate provided against the second side of the target, a charge accumulation mode writing and erasing means through which the target plate can be written and erased in the charge accumulation mode for applying to the optical relay a video information component of a video signal formed by a sequence of scanned lines, characterized in that said charge accumulation mode writing and erasing means comprises a video amplifier applying video modulation to a wehnelt electrode in said optical relay during a write mode, and polarizing generators coupled to the grid-shaped anode, the transparent thin plate and an electron beam deflection device, said charge accumulation mode writing and erasing means cooperating with precursor erasing means acting on a limited number q of scanning lines positioned beyond the line n on which a writing operation is effected.

2. An optical relay as claimed in claim 1, characterized in that it comprises an auxiliary focussing grid arranged behind the wehnelt, in the beam propagation direction, this auxiliary focussing grid receiving a part of the video modulation applied to the wehnelt so as to enable recovery of a half-tone scale in the final picture.

3. An optical relay as claimed either claim 1 or claim 2, characterized in that the precursor erasing means comprise a line counter which determines an $(n+p)^{th}$ scanning line, this counter energizing the electron beam deflection device acting on the electron beam to ensure that on the target plate it erases q lines substantially centred around the $(n+p)^{th}$ line without affecting line n, where p is higher than q/2.

4. An optical relay as claimed in claim 3, characterized in that the electron beam deflection device the beam deflection to describe on the target plate a rectangular figure formed by a trace path during which writing of the line n is effected, the electron gun producing a focussed beam with a write current, and a retrace path during which the erase is effected, the electron gun producing a wide beam having an erase current exceeding the write current and the electron gun including means for withdrawing at least the total number of charges deposited during the writing procedure during the erase procedure.

5. An optical relay as claimed in either claim 1 or claim 2, characterized in that, for transmission of pictures in accordance with an interlaced-line television standard, the relay includes a converter device which changes the interlaced standard into a non-interlaced standard.

6. An optical relay as claimed in claim 5, characterized in that the converter device includes an analog-to-digital converter acting on an interlaced video signal, a field change-over switch which alternately directs each field of the interlaced video signal to two paths, each of these paths comprising:

a half-field change-over switch which alternately conveys each half-field to two memories storing the respective odd and even fields, thereafter a line change-over switch which alternately selects even and odd lines so as to compose a non-interlaced field, each said non-interlaced field of the two paths being alternately selected by means of a field change-over switch which renders it possible to effect reading of one of the paths while the other path is being loaded and vice versa, a selected signal being reconverted into an analog signal with the aid of a digital-to-analog converter, thereafter filtered by means of a filter for supplying a non-interlaced video signal.

* * * * *